United States Patent
Mu

(10) Patent No.: US 12,519,525 B2
(45) Date of Patent: Jan. 6, 2026

(54) METHOD AND APPARATUS FOR REPORTING CHANNEL QUALITY INDICATION (CQI), AND STORAGE MEDIUM

(71) Applicant: Beijing Xiaomi Mobile Software Co., Ltd., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 385 days.

(21) Appl. No.: 18/246,271

(22) PCT Filed: Sep. 30, 2020

(86) PCT No.: PCT/CN2020/119717
§ 371 (c)(1),
(2) Date: Mar. 22, 2023

(87) PCT Pub. No.: WO2022/067794
PCT Pub. Date: Apr. 7, 2022

(65) Prior Publication Data
US 2023/0361839 A1    Nov. 9, 2023

(51) Int. Cl.
*H04B 7/06* (2006.01)
*H04L 1/00* (2006.01)
*H04L 5/00* (2006.01)

(52) U.S. Cl.
CPC ......... *H04B 7/0632* (2013.01); *H04L 1/0026* (2013.01); *H04L 5/0057* (2013.01)

(58) Field of Classification Search
CPC ... H04B 7/0632; H04L 1/0026; H04L 5/0057; H04L 5/006
See application file for complete search history.

(56) References Cited

U.S. PATENT DOCUMENTS

| | | | |
|---|---|---|---|
| 10,728,784 B2 * | 7/2020 | Yi | H04B 17/336 |
| 2017/0048822 A1 | 2/2017 | Lee et al. | |
| 2017/0273135 A1 * | 9/2017 | Siomina | H04W 68/02 |
| 2019/0215710 A1 * | 7/2019 | Yi | H04L 5/0064 |
| 2021/0144701 A1 * | 5/2021 | Ly | H04L 41/0895 |
| 2021/0203392 A1 * | 7/2021 | Kwak | H04B 7/0478 |
| 2021/0218493 A1 * | 7/2021 | Chen | H04L 1/0026 |
| 2023/0091795 A1 * | 3/2023 | Lei | H04L 5/001 |
| | | | 370/329 |
| 2023/0223984 A1 * | 7/2023 | Xi | H04B 1/713 |
| | | | 370/329 |

(Continued)

FOREIGN PATENT DOCUMENTS

| CN | 105101301 A | 11/2015 |
|---|---|---|
| CN | 109328483 A | 2/2019 |

(Continued)

OTHER PUBLICATIONS

"Considerations on RLM for NR V2X unicast," Proceedings of the 3GPP TSG-RAN WG2 Meeting#106, Huawei, HiSilicon, R2-1907419 (revision of R2-1904876), May 13, 2019, Reno, Nevada, 4 pages.

*Primary Examiner* — Kent Krueger
(74) *Attorney, Agent, or Firm* — McCoy Russell LLP

(57) ABSTRACT

A method for reporting a channel quality indication (CQI) is applied to a first type of terminal and includes: determining a CQI parameter set corresponding to the first type of terminal; and reporting the CQI according to the CQI parameter set.

19 Claims, 5 Drawing Sheets

(56) References Cited

U.S. PATENT DOCUMENTS

| | | | |
|---|---|---|---|
| 2023/0261729 A1* | 8/2023 | Huang | H04W 4/06 375/267 |
| 2023/0275797 A1* | 8/2023 | Chen | H04L 5/0082 375/262 |
| 2023/0284148 A1* | 9/2023 | Huang | H04L 5/0023 370/318 |

FOREIGN PATENT DOCUMENTS

| | | |
|---|---|---|
| CN | 109691174 A | 4/2019 |
| CN | 110380959 A | 10/2019 |
| WO | 2018006253 A1 | 1/2018 |

* cited by examiner

METHOD AND APPARATUS FOR REPORTING CHANNEL QUALITY INDICATION (CQI), AND STORAGE MEDIUM

CROSS REFERENCE TO RELATED APPLICATION

The present application is a U.S. National Phase of International Application No. PCT/CN2020/119717 entitled "CHANNEL QUALITY INDICATION (CQI) REPORTING METHOD AND APPARATUS, AND STORAGE MEDIUM," and filed on Sep. 30, 2020. The entire contents of the above-listed application are hereby incorporated by reference for all purposes.

BACKGROUND

In the radio communication system, the machine type communication (MTC) and the narrow band Internet of Things (NB-IoT) have been developed for scenarios with a low rate, a long delay, etc., of the Internet of Things service.

Owing to the development of the Internet of Things service, the MTC and the NB-IoT fail to satisfy the requirements for the rate and delay of the existing Internet of Things service. Thus, a novel terminal, reduced capability user equipment (Redcap UE, or NR-lite for short), was designed to fulfill the requirements of the Internet of Things service.

SUMMARY

According to a first aspect of examples of the disclosure, a method for reporting a channel quality indication (CQI) is provided. The method is applied to a first type of terminal and includes:
determining a CQI parameter set corresponding to the first type of terminal; and reporting the CQI according to the CQI parameter set.

According to a second aspect of examples of the disclosure, provided is an apparatus for reporting a channel quality indication (CQI). The apparatus includes:
a processor; and a memory configured to store an instruction executable by the processor; where the processor is configured to execute the method for reporting a CQI in the first aspect or in any one of the examples in the first aspect.

According to a third aspect of examples of the disclosure, provided is a non-transitory computer-readable storage medium, where an instruction in a storage medium causes a mobile terminal to execute the method for reporting a CQI in the first aspect or any one of the examples in the first aspect when executed by a processor of the mobile terminal.

It is to be understood that the above general description and the following detailed description are merely illustrative and explanatory, and are not intended to limit the disclosure.

BRIEF DESCRIPTION OF THE DRAWINGS

The accompanying drawings are incorporated in the description as a constituent part of the description, illustrate examples conforming to the disclosure, and serve to explain the principles of the disclosure along with the description.

DETAILED DESCRIPTION

Figure 1:
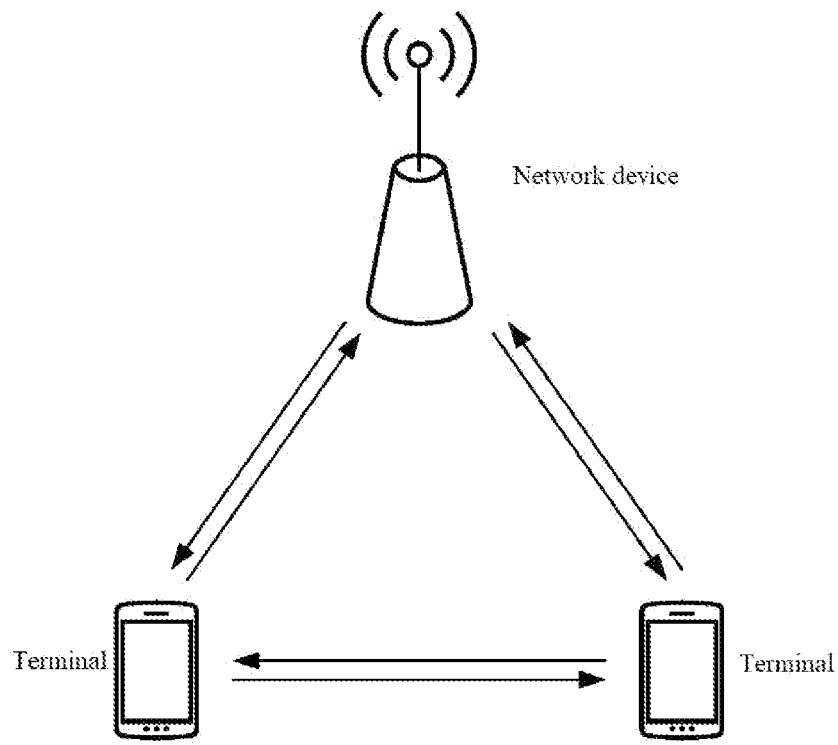
FIG. 1 is an architecture diagram of a communication system of a network device and a terminal shown according to an example.

The examples will be described in detail here and shown in the accompanying drawings illustratively. When the following descriptions involve the accompanying drawings, unless otherwise specified, the same numeral in different accompanying drawings denotes the same or similar element. The examples described in the following examples do not denote all examples consistent with the disclosure. On the contrary, the examples are merely instances of apparatuses and methods consistent with some aspects of the disclosure as recited in the appended claims.

The disclosure relates to the technical field of radio communication, and in particular to a method and apparatus for reporting a channel quality indication (CQI), and a storage medium.

In a communication system, machine type communication (MTC) and narrow band Internet of Things (NB-IoT) have been developed in the related art for scenarios (for example, meter reading, environmental monitoring, etc.) with a low rate, a long delay, etc. of Internet of Things services. Currently, the NB-IoT can support a rate of several hundred Kilobytes at most, and the MTC can support a rate of several Megabytes at most. However, with the Internet of Things services (such as monitoring, smart home, wearable devices, industrial sensor detection, etc.) continuously developed, generally, a rate of tens to one hundred Megabytes and a longer delay are required. Thus, in the communication system, the MTC and the NB-IoT have failed to satisfy the requirements of the existing Internet of Things service. Thus, it is proposed to design novel user equipment (UE) in a new radio of the communication system, so as to cover the service requirements of a middle-end Internet of Things device that requires a rate of tens to one hundred Megabytes and has a long delay. Currently, in the 3rd generation partnership project (3GPP) standardization, the user equipment configured to cover the service requirements of the middle-end Internet of Things device that requires the rate of tens to one hundred M and has the long delay is referred to as reduced capability UE (Redcap UE or NR-lite for short).

Moreover, in another aspect, the NR-lite is generally required to satisfy the requirements of a low cost, a low complexity, coverage enhancement to a certain degree, power saving, etc. However, the new radio communication technology is designed for a high-end terminal having a high rate, a short delay, etc., and thus cannot satisfy the requirements described above of the NR-lite. Thus, it is required to modify the existing new radio communication technology, so as to satisfy the requirements described above of the NR-lite. For example, according to the requirements of the low cost and the low complexity, a radio frequency (RF) bandwidth of a new radio Internet of Things may be limited (for example, the bandwidth is limited to 5 MHz or 10 MHz; or a buffer of the NR-lite is limited), and thus a size of a transmission block received each time is limited. For another example, according to the requirement of power saving, a communication process may be simplified to reduce the number of downlink control channel detection by an NR-lite user.

However, in the radio communication system, after measuring a channel, the terminal is required to report a measured SINR to a network side in a form of CQI. In the wireless communication system, the terminal reports the CQI based on a CQI parameter set. In other words, the SINR measured by the terminal satisfies reference resources of the CSI parameter set. A modulation mode, a channel coding rate, and a spectral efficiency corresponding to the CQI parameter set are determined, and a highest index of the CQI is selected from all indexes of the CQI satisfying the requirement of a block error rate (BLER). The highest index of the CQI is reported to a network, and the network side determines a corresponding modulation mode, channel coding rate, and spectral efficiency according to the index of the CQI. In the related art, for a terminal of 64 QAM, two CQI parameter sets, a first CQI parameter set and a second CQI parameter set may be used. The first CQI parameter set and the second CQI parameter set correspond to different requirements of the BLER separately. The first CQI parameter set is used when a demand that the BLER is equal to a first threshold is satisfied correspondingly, and reference may be made to Table 1. The second CQI parameter set is used when a demand that the BLER is equal to a second threshold is satisfied correspondingly, and reference may be made to Table 2. It is to be understood that a spectral efficiency supported by the second CQI parameter set is lower than that supported by the first CQI parameter set.

TABLE 1

| CQI index | Modulation | code rate × 1024 | Efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 2

| CQI index | Modulation | code rate × 1024 | Efficiency |
| --- | --- | --- | --- |
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |

TABLE 2-continued

| CQI index | Modulation | code rate × 1024 | Efficiency |
| --- | --- | --- | --- |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

It may be understood that each element in Table 1 and Table 2 is independent, and these elements are illustratively listed in the same table, but it does not mean that all the elements in the tables must be present at the same time as shown in the tables. A value of each element is independent of a value of any other element in Table 1 and Table 2. Thus, those skilled in the art may understand that the value of each element in Table 1 and Table 2 is an independent example.

However, owing to the limitation of a capability of the Redcap UE, for example, the reduction in number of antennas and bandwidth, a coverage capability of the Redcap UE is also limited. In certain cases, a measured SINR of the Redcap UE is lower than a range of an SINR supported by the CQI parameter set. For the first CQI parameter set, a lowest SINR supported by the first CQI parameter set is about −5 dB. When being lower than −5 dB, the measured SINR of the terminal is out of the range of the SINR supported by the first CQI parameter set, and an index of the CQI reported by the terminal is 0, that is, CQI=0. In the first CQI parameter set, information corresponding to the index 0 of the CQI is out of range. For Redcap UE having only one antenna, most of measured SINRs are out of range. If the terminal only reports information of out of range, the network fails to accurately determine a channel quality when receiving the CQI reported by the terminal, and thus fails to determine a corresponding coverage compensation strategy.

Thus, the disclosure provides a method for reporting a channel quality indication (CQI). A CQI parameter set is re-determined by adjusting a first CQI parameter set. Alternatively, a second CQI parameter set is used or a range of an SINR is adjusted, so that when reporting corresponding CQI information, an SINR is not out of range any more. FIG. 1 is an architecture diagram of a communication system of a network device and a terminal shown according to an example. The method for reporting a channel quality indication (CQI) according to the disclosure may be applied to the architecture diagram of the communication system shown in FIG. 1. As shown in FIG. 1, the terminal reports the CQI, and the network device determines a modulation mode, a channel coding rate, and a spectral efficiency of the terminal in such a condition according to the received CQI.

It may be understood that the radio communication system of the network device and the terminal shown in FIG. 1 is merely illustrative and may also include other network devices, for example, core network devices, radio relay devices, radio backhaul devices, etc., which are not depicted in FIG. 1. The example of the disclosure does not limit the number of network devices and the number of terminals included in the radio communication system.

It may be further understood that the radio communication system according to the example of the disclosure is a network providing a radio communication function. The radio communication system may employ different communication technologies, for example, code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. Networks may be classified into 2nd generation (2G) networks, 3G networks, 4G networks, or future evolved networks, for example, 5G networks according to factors of capacity, rate, delay, etc. of different networks. The 5G networks may also be referred to as new radio (NR) networks. For convenience of description, the disclosure sometimes refers to a radio communication network simply as a network.

Further, the network device involved in the disclosure may also be referred to as a radio access network device. The radio access network device may be a base station, an evolved base station (evolved node B, base station), a home base station, an access point (AP) in a wireless fidelity (WIFI) system, a radio relay node, a radio backhaul node, a transmission point (TP), a transmission and reception point (TRP), etc., may be a gNB in an NR system, or may be an assembly or some of devices constituting a base station, etc. When being a vehicle-to-everything (V2X) communication system, the network device may also be a vehicle-mounted device. It is to be understood that an example of the disclosure does not limit a specific technology and a specific device form employed by the network device.

Further, a terminal involved in the disclosure may also be referred to as a terminal device, user equipment (UE), a mobile station (MS), a mobile terminal (MT), etc., and is a device that provides a user with speech and/or data connectivity. For example, the terminal may be a handheld device, a vehicle-mounted device, etc., which has a radio connection function. Some instances of the terminal include a mobile phone, a pocket personal computer (PPC), a palmtop computer, a personal digital assistant (PDA), a laptop computer, a tablet computer, a wearable device, a vehicle-mounted device, etc. In addition, when being a vehicle-to-everything (V2X) communication system, the terminal device may also be a vehicle-mounted device. It is to be understood that the example of the disclosure does not limit a specific technology and a specific device form employed by the terminal.

The example of the disclosure provides a method for reporting a channel quality indication (CQI).

Figure 2:
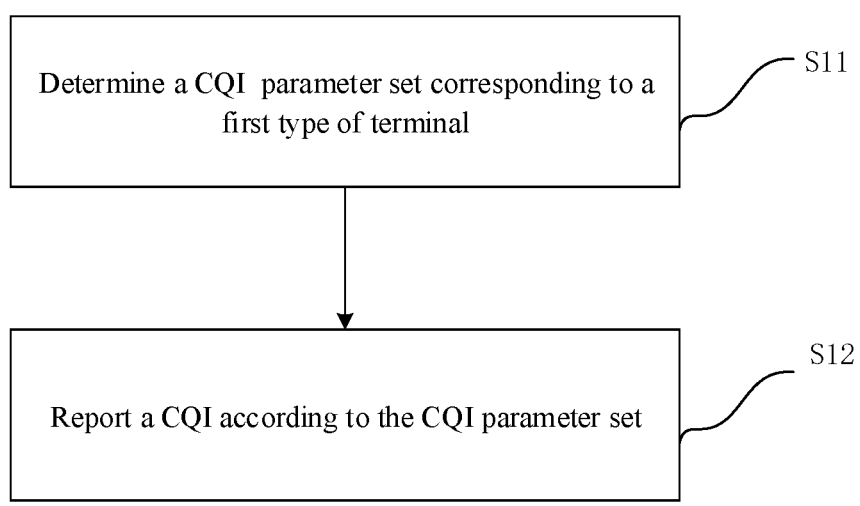
FIG. 2 is a flowchart of a method for reporting a channel quality indication (CQI) shown according to an example.

FIG. 2 is a flowchart of a method for reporting a channel quality indication (CQI) shown according to an example. As shown in FIG. 2, the method for reporting a channel quality indication (CQI) is applied to a first type of terminal and includes:

Step S11, determine a CQI parameter set corresponding to a first type of terminal.

Step S12, report a CQI according to the CQI parameter set.

In the example of the disclosure, the first type of terminal is reduced capability user equipment (Redcap UE), and the Redcap UE may have a spectral efficiency less than a first threshold, where an SINR corresponding to the first threshold of the spectral efficiency is −5 dB. When the spectral efficiency of the first type of terminal is less than the first threshold, a corresponding CQI parameter set is determined according to a received instruction message sent by a network device. An index of the reported CQI is determined in the corresponding CQI parameter set according to requirements of a channel quality parameter measured by the first type of terminal and a block error rate. In the example of the disclosure, the instruction message sent by the network device may be determined based on predefined information or a signaling instruction, where the signaling may be radio resource control (RRC) signaling, etc.

In the example of the disclosure, the CQI parameter set, which may also be referred to as a CQI table, includes at least one of the following: indexes of the CQI, and a modulation method, a coding rate, and a spectral efficiency corresponding to each index of the CQI. The terminal may report the index of the CQI based on the CQI parameter set determined to be used, and the network device may determine corresponding information based on the index of the CQI reported by the terminal, so as to determine a channel state of the terminal.

In the example of the disclosure, the index of the CQI may indicate different indexes of the CQI based on a specified number of bit. The specified number of bit may be determined based on the number of the indexes of the CQI. For example, if the CQI parameter set includes 16 indexes of the CQI, 4 bits may be used to indicate different indexes of the CQI. For example, 0000 indicates that the index of the CQI is 0, 0001 indicates that the index of the CQI is 1, and so on. Certainly, this is only an example and is not to limit the example of the disclosure.

In some examples of the disclosure, a method for reporting a channel quality indication (CQI) may determine a CQI parameter set as a third CQI parameter set, and report the CQI based on the third CQI parameter set. The third CQI parameter set is determined by adding a first CQI parameter set with a new different spectral efficiency. This example of the disclosure may be implemented alone or in combination with any other example of the disclosure, which is not limited to the example of the disclosure.

In the example of the disclosure, a lowest spectral efficiency corresponding to the third CQI parameter set is less than a first threshold. And/or, a highest spectral efficiency corresponding to the third CQI parameter set is less than a second threshold. It may be understood that the first CQI parameter set is a CQI parameter set corresponding to a second type of terminal satisfying a requirement of a first BLER. The requirement of the first BLER is that a BLER of a data channel of the terminal is less than or equal to a first percentage threshold (for example, 10%). In the example of the disclosure, the third determined CQI parameter set is determined based on the first CQI parameter set. In other words, the third CQI parameter set determined in the example of the disclosure is obtained by adding the spectral efficiency less than the first threshold into the first CQI parameter set, and deleting a preset number of relatively high spectral efficiencies from the first CQI parameter set. For convenience of description, in the example of the disclosure, the lowest spectral efficiency within the first CQI parameter set is referred to as the first threshold, and the highest spectral efficiency within the first CQI parameter set is referred to as the second threshold. In some examples, the number of the spectral efficiency added may be the same as that of the spectral efficiency deleted.

In the example of the disclosure, the number of indexes of the CQI within the third determined CQI parameter set is the same as the number of indexes of the CQI within the first CQI parameter set. As described above, when the number of the indexes of the CQI is determined, if a new spectral efficiency less than the first threshold is added into the first CQI parameter set, a relatively high spectral efficiency is required to be deleted from the first CQI parameter set. So as to obtain a new CQI parameter set, and to determine the new CQI parameter set as a third CQI parameter set. Moreover, the third determined CQI parameter set includes at least one spectral efficiency less than the first threshold.

For example, in the disclosure, two spectral efficiencies less than the first threshold are added, and two relatively high spectral efficiencies are deleted as an example to determine the third CQI parameter set. Reference may be made to Table 3. There are 16 different indexes of the CQI. The indexes of the CQI include ca modulation mode, a channel coding rate, and a spectral efficiency corresponding to each index of the CQI.

TABLE 3

| CQI index | Modulation | code rate x 1024 | Efficiency |
|---|---|---|---|
| 0 | | out of range | |
| 1 | QPSK | y | n |
| 2 | QPSK | x | m |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

It may be understood that each element in Table 3 is independent, and these elements are illustratively listed in the same table, but it does not mean that all the elements in the table must be present at the same time as shown in the table. A value of each element is independent of a value of any other element in Table 3. Thus, those skilled in the art may understand that the value of each element in Table 3 is an independent example.

As shown in Table 3, the two spectral efficiencies less than the first threshold are added, which correspond to index 1 of the CQI and index 2 of the CQI, where the first threshold is 0.1523. Thus, n<m<0.1523, a channel coding rate corresponding to n is x, a channel coding rate corresponding to m is y, and a channel coding rate corresponding to 0.1523 is 78, so that y<x<78. Also, associated information corresponding to indexes of the CQI to which the relatively high spectral efficiencies 3.9023 and 4.5234 belong is deleted. It may be understood that in the disclosure, adding the two spectral efficiencies less than the first threshold is only an example to facilitate understanding, and does not specifically limit the number of added spectral efficiencies less than the first threshold.

In the example of the disclosure, the relatively high spectral efficiencies in the first CQI parameter set are determined to be deleted based on the number of the spectral efficiencies less than the first threshold and added into the first CQI parameter set, so as to determine the third CQI parameter set. If a plurality of relatively high spectral efficiencies in the first CQI parameter set are deleted, the relatively high spectral efficiencies deleted may be spectral efficiencies corresponding to continuous indexes of the CQI, or spectral efficiencies corresponding to discontinuous indexes of the CQI. In the example of the disclosure, some Redcap UE or all Redcap UE may be configured with the third determined CQI parameter set. While other types of terminals may be configured with the first CQI parameter set determined through a communication protocol.

In some examples of the disclosure, a method for reporting a channel quality indication (CQI) may determine a CQI parameter set as a second CQI parameter set, and report the CQI based on the second CQI parameter set. This example of the disclosure may be implemented alone or in combination with any other example of the disclosure, which is not limited to the example of the disclosure.

In the example of the disclosure, the second CQI parameter set is a CQI parameter set corresponding to the second type of terminal (satisfying a requirement of a second BLER). The requirement of the second BLER is that a BLER of a data channel of the terminal is less than or equal to as a second percentage threshold (for example, 0.00001). In the example of the disclosure, based on an indicator configured to indicate the Redcap UE and included in an instruction message, a network device determines that the CQI may be reported through the second CQI parameter set when a BLER of a data channel of the Redcap UE is less than the first percentage threshold (for example, 10%); and alternatively, a network device determines that the CQI may be reported through the second CQI parameter set when a BLER of a data channel of the Redcap UE is equal to the first percentage threshold (for example, 10%). In other words, when the terminal type is the Redcap UE and the BLER of the data channel of the Redcap UE is less than or equal to the first in percentage threshold (for example, 10%), the second CQI parameter set is used. Alternatively, when the network device configures the terminal with the second CQI parameter set through a first instruction message, that is, the terminal is explicitly configured with the second CQI parameter set, it is determined that the CQI is reported through the second CQI parameter set. The first instruction message is configured to instruct the terminal to be configured with the second CQI parameter set. In the example of the disclosure, the second type of terminal may be a normal new radio (NR) terminal, and the first type of terminal may be the reduced capability user equipment (Redcap UE).

In some examples of the disclosure, a method for reporting a channel quality indication (CQI) may determine a CQI parameter set as a first CQI parameter set, and report the CQI based on the first CQI parameter set. This example of the disclosure may be implemented alone or in combination with any other example of the disclosure, which is not limited to the example of the disclosure.

Figure 3:
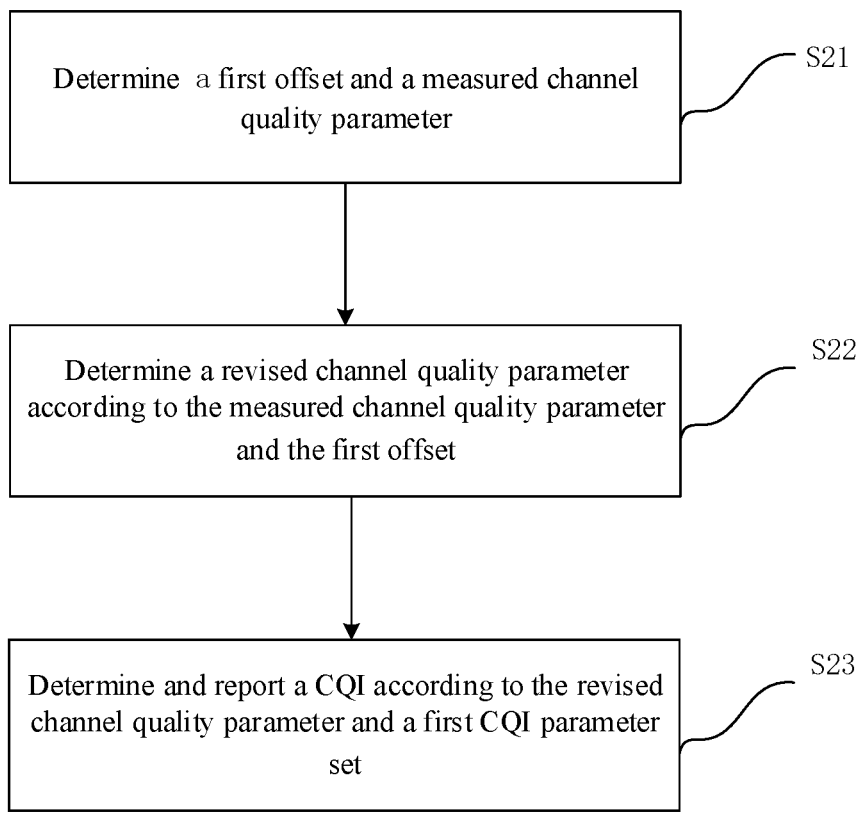
FIG. 3 is a flowchart of another method for reporting a channel quality indication (CQI) shown according to an example.

FIG. 3 is a flowchart of a method for reporting a channel quality indication (CQI) shown according to an example. As shown in FIG. 3, the method for reporting a channel quality indication (CQI) is applied to reduced capability user equipment (Redcap UE) and includes:

Step S21, determine a first offset and a measured channel quality parameter.

Step S22, determine a revised channel quality parameter according to the measured channel quality parameter and the first offset.

Step S23, determine and report a CQI according to the revised channel quality parameter and a first CQI parameter set.

In the example of the disclosure, the first offset may be offset based on the channel quality parameter, and the revised channel quality parameter may be determined by adding the measured channel quality parameter with the first offset. A spectral efficiency corresponding to the revised channel quality parameter is within a range of spectral efficiency within the first CQI parameter set corresponding to a second type of terminal satisfying a requirement of a BLER. Thus, it is determined that the CQI may be reported through the first CQI parameter set based on a revised CQI. When receiving an index of the CQI reported based on the first CQI parameter set, a network device may also determine the first offset, and further determine a measured SINR after the first offset is excluded, so as to determine existing channel state information of a channel of the terminal. In the example of the disclosure, the first offset may be determined based on predefined information or a communication protocol.

For example, the SINR and the first offset of channel quality parameters measured by the first type of terminal are −5 dB and 5 dB, respectively. A spectral efficiency corresponding to −5 dB is out of the range of spectral efficiency within the first CQI parameter set. In such a condition, the measured SINR of −5 dB is added with the first offset of 5 dB to obtain a revised SINR of 0. A spectral efficiency corresponding to the revised SINR is within the range of spectral efficiency within the first CQI parameter set. Thus, the terminal may determine the revised CQI based on the revised SINR, and report the CQI based on the first CQI parameter set determined through the revised CQI and the communication protocol.

In some examples of the disclosure, a method for reporting a channel quality indication (CQI) may further determine a CQI parameter set as a first CQI parameter set, and report the CQI based on the first CQI parameter set. This example of the disclosure may be implemented alone or in combination with any other example of the disclosure, which is not limited to the example of the disclosure.

Figure 4:
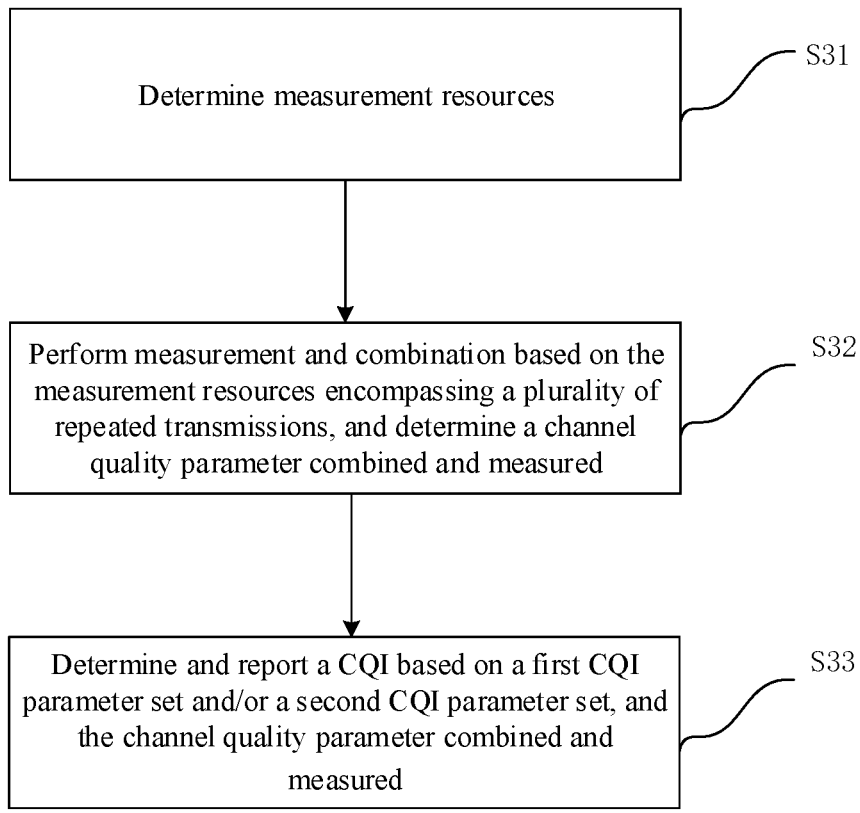
FIG. 4 is a flowchart of yet another method for reporting a channel quality indication (CQI) shown according to an example.

FIG. 4 is a flowchart of a method for reporting a channel quality indication (CQI) shown according to an example. As shown in FIG. 4, the method for reporting a channel quality indication (CQI) is applied to reduced capability user equipment (Redcap UE) and includes:

Step S31, determine measurement resources.

The measurement resources include a plurality of repeated transmissions.

Step S32, perform measurement and combination based on the measurement resources encompassing a plurality of repeated transmissions, and determine a channel quality parameter combined and measured.

Step S33, determine and report a CQI based on a first CQI parameter set and/or a second CQI parameter set, and the channel quality parameter combined and measured.

In the example of the disclosure, a BLER of a data channel is determined based on reference resources of channel state information (CSI). Thus, the measurement resources may be determined based on the reference resources of the CSI, where the measurement resources at least include the repetition number of the reference resources of the CSI. In such a condition, the measurement may be re-performed based on the reference resource for performing the plurality of repeated transmissions, and a BLER of the data channel measured each time may be combined, so as to determine the channel quality parameter combined and measured. According to the channel quality parameter combined and measured, an index of the CQI reported in a first CQI parameter set corresponding to a second determined type of terminal satisfying a requirement of a first block error rate (BLER), and/or in the second CQI parameter set corresponding to a second type of terminal satisfying a requirement of a second block error rate (BLER).

In the example of the disclosure, the plurality of repeated transmissions may be configured with the repetition number, in a time domain, of the reference resources of the CSI. In one example, a network device configures the reference resources of the CSI for the Redcap UE to perform the repetition in a time domain, which may be determined based on radio resource control (RRC) signaling. Alternatively, in another example, a network device configures the reference resources of the CSI for the Redcap UE to perform the repetition in a time domain, which may be determined based on the maximum transmission number of a downlink physical channel, for example, the maximum repetition number of a physical downlink control channel (PDCCH) or the maximum repetition number of a physical downlink shared channel (PDSCH).

It is to be understood that in the example of the disclosure, the requirement of the first BLER is that a BLER of a data channel is less than a first percentage threshold (for example, 10%) when a modulation mode and a coding rate in the CQI parameter set are used. Alternatively, the requirement of the first BLER is that a BLER of a data channel is equal to a first percentage threshold when a modulation mode and a coding rate in the CQI parameter set are used. The requirement of the second BLER is that a BLER of a data channel is less than a second percentage threshold (for example, 0.0001) when a modulation mode and a coding rate in the CQI parameter set are used. Alternatively, the requirement of the second BLER is that a BLER of a data channel is equal to a second percentage threshold when a modulation mode and a coding rate in the CQI parameter set are used. In the example of the disclosure, the first type of terminal has a less channel quality parameter than the second type of terminal.

The technical solutions according to the examples of the disclosure may have the beneficial effects as follows: by employing the CQI parameter set corresponding to reduced capability user equipment and configured to report the CQI, a network device may determine accurate channel state information of the terminal according to an index of the reported CQI, so as to employ a corresponding compensation strategy for compensation.

Based on the same concept, an example of the disclosure provides an apparatus for reporting a channel quality indication (CQI).

It may be understood that in order to realize the functions described above, the apparatus for reporting a channel quality indication (CQI) according to the example of the disclosure includes corresponding hardware structures and/or software modules for executing all the functions. The example of the disclosure may be implemented in the form of hardware or a combination of hardware and computer software, in combination with units and algorithm steps of each instance disclosed in the example of the disclosure. Whether a certain function is executed by hardware or computer software-driven hardware depends on particular application of the technical solution and design constraints. Those skilled in the art may use different methods to implement the described functions for each particular application, but such implementation should not be considered to be beyond the scope of the technical solution of the example of the disclosure.

Figure 5:
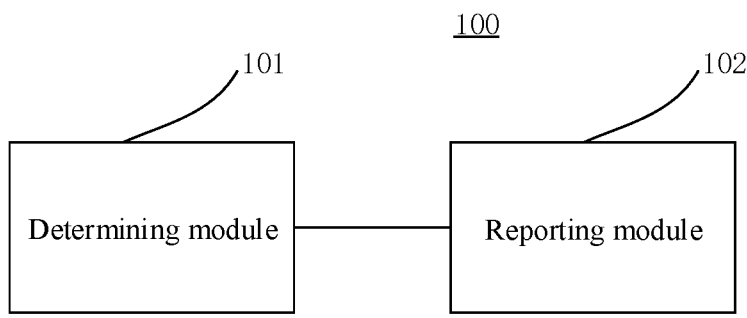
FIG. 5 is a block diagram of an apparatus for reporting a channel quality indication (CQI) shown according to an example.

FIG. 5 is a block diagram of an apparatus 100 for reporting a channel quality indication (CQI) shown according to an example. With reference to FIG. 5, the apparatus for reporting a channel quality indication (CQI) is applied to a first type of terminal and includes a determining module 101 and a reporting module 102.

The determining module 101 is configured to determine a CQI parameter set corresponding to the first type of terminal. The reporting module 102 is configured to report the CQI according to the CQI parameter set.

In the example of the disclosure, the CQI parameter set is a third CQI parameter set.

A lowest spectral efficiency corresponding to the third CQI parameter set is less than a first threshold. And/or, a highest spectral efficiency corresponding to the third CQI parameter set is less than a second threshold.

In the example of the disclosure, the first threshold is determined based on a lowest spectral efficiency within a first CQI parameter set. The first CQI parameter set is a CQI parameter set corresponding to a second type of terminal satisfying a requirement of a first block error rate (BLER).

In the example of the disclosure, the third CQI parameter set has the same number of indexes of the CQI as the first CQI parameter set, and includes at least one spectral efficiency less than the first threshold.

In the example of the disclosure, the CQI parameter set is a second CQI parameter set, the second CQI parameter set being a CQI parameter set corresponding to the second type of terminal satisfying a requirement of a second BLER.

In the example of the disclosure, the reporting module 102 is configured to, in response to determining that a spectral efficiency of the first type of terminal is less than the first threshold, report the CQI according to the second CQI parameter set. Alternatively, the reporting module is configured to, in response to determining that the first type of terminal receives a first instruction message, report the CQI according to the second CQI parameter set, the first instruction message being configured to instruct the terminal to be configured with the second CQI parameter set.

In the example of the disclosure, the reporting module 102 is configured to determine a first offset and a measured channel quality parameter.

The reporting module is also configured to determine a revised channel quality parameter according to the measured channel quality parameter and the first offset. The reporting module is further configured to determine and report the CQI according to the revised channel quality parameter and the first CQI parameter set.

In the example of the disclosure, the first offset is determined based on predefined information.

In the example of the disclosure, the reporting module 102 is configured to determine measurement resources, the measurement resources including a plurality of repeated transmissions. The reporting module is also configured to perform measurement and combination based on the measurement resources encompassing the plurality of repeated transmissions, and determining a channel quality parameter combined and measured. The reporting module is further configured to determine and report the CQI based on the first CQI parameter set and/or the second CQI parameter set, and the channel quality parameter combined and measured.

In the example of the disclosure, the number of the plurality of repeated transmissions is determined based on radio resource control (RRC) signal or based on the maximum transmission number of the downlink physical channel.

In the example of the disclosure, a requirement of a first BLER is that a BLER of a data channel is less than a first percentage threshold when a modulation mode and a coding rate in the CQI parameter set are used. Alternatively, a requirement of a first BLER is that a BLER of a data channel is equal to a first percentage threshold when a modulation mode and a coding rate in the CQI parameter set are used.

In the example of the disclosure, a requirement of a second BLER is that a BLER of a data channel is less than a second percentage threshold when a modulation mode and a coding rate in the CQI parameter set are used. Alternatively, a requirement of a second BLER is that a BLER of a data channel is equal to a second percentage threshold when a modulation mode and a coding rate in the CQI parameter set are used.

In the example of the disclosure, the first type of terminal has a less channel quality parameter than the second type of terminal.

For the apparatus in the example described above, specific ways in which each module executes operations have been described in detail in the examples relating to the method, and will not be described in detail here.

Figure 6:
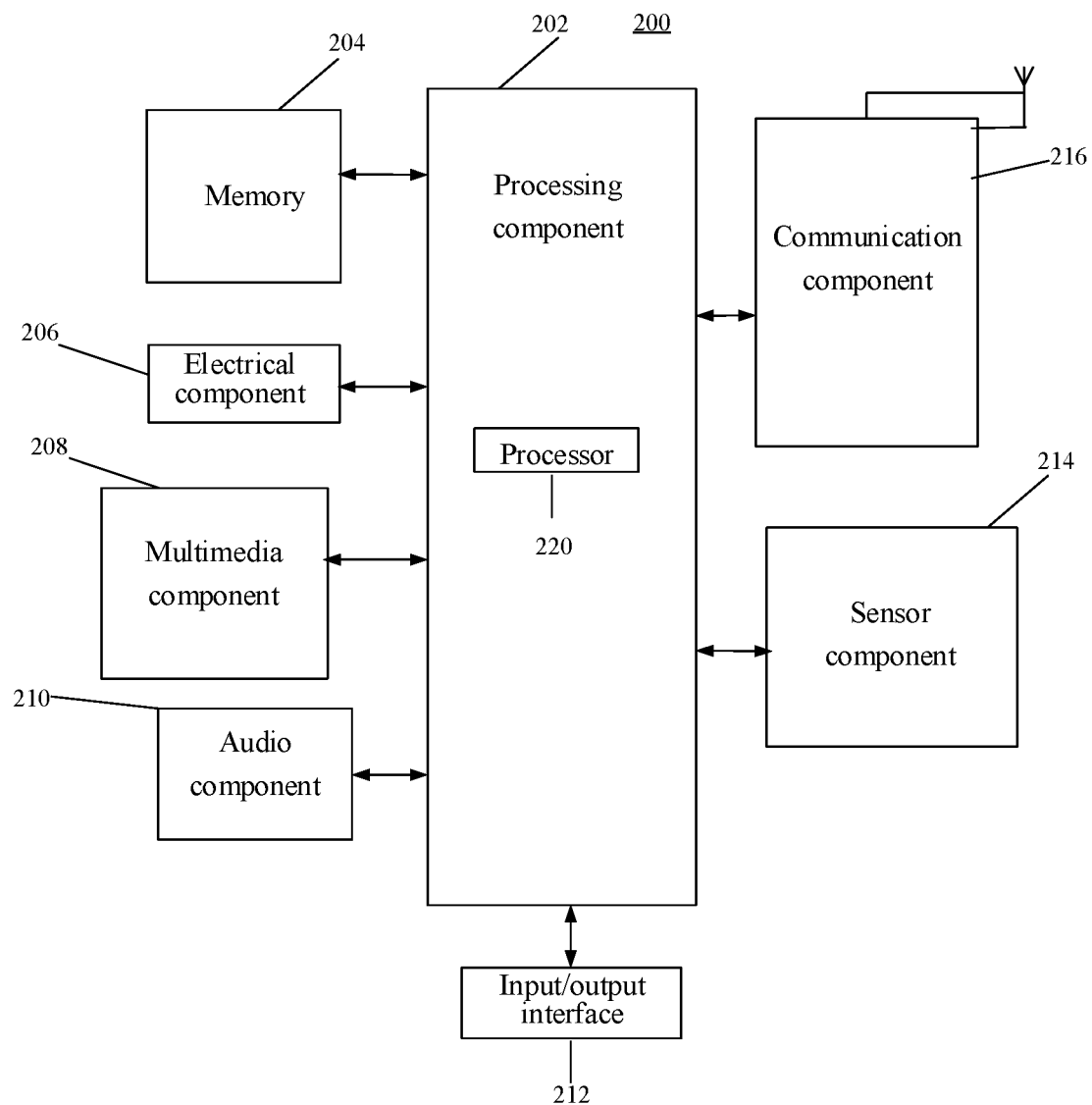
FIG. 6 is a block diagram of an apparatus for reporting a channel quality indication (CQI) shown according to an example.

FIG. 6 is a block diagram of an apparatus 200 for reporting a channel quality indication (CQI) shown according to an example. For example, the apparatus 200 may be a mobile phone, a computer, a digital broadcast terminal, a messaging device, a gaming console, a tablet device, a medical device, a fitness device, a personal digital assistant, etc.

With reference to FIG. 6, the apparatus 200 may include one or more of a processing component 202, a memory 204, an electrical component 206, a multimedia component 208, an audio component 210, an input/output (I/O) interface 212, a sensor component 214, and a communication component 216.

The processing component 202 generally controls overall operations of the apparatus 200, for example, operations associated with display, phone calls, data communication, camera operations, and recording operations. The processing component 202 may include one or more processors 220 to execute an instruction, so as to complete all or some of the steps of the method described above. In addition, the processing component 202 may include one or more modules to facilitate interaction between the processing component 202 and other assemblies. For example, the processing component 202 may include the multimedia module to facilitate interaction between the multimedia component 208 and the processing component 202.

The memory 204 is configured to store various types of data to support the operation of the apparatus 200. For example, these data include instructions for any application or method operating on the apparatus 200, contact data, phonebook data, messages, pictures, video, etc. The memory 204 may be implemented by any type of volatile or non-volatile memory device, or their combination, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The electrical component 206 supplies power to various assemblies of the apparatus 200. The electrical component 206 may include a power supply management system, one or more power supplies, and other assemblies associated with power generating, managing, and distributing for the apparatus 200.

The multimedia assembly 208 includes a screen that provides an output interface between the apparatus 200 and a user. In some examples, the screen may include a liquid crystal display (LCD) and a touch panel (TP). If including a touch panel, the screen may be implemented as a touch screen, so as to receive an input signal from a user. The touch panel includes one or more touch sensors, to sense touches, swipes, and gestures on the touch panel. Except for sensing a boundary of a touch or swipe action, the touch sensor may also detect a duration and a pressure associated with a touch or swipe operation. In some examples, the multimedia component 208 includes a front-facing camera and/or a rear-facing camera. When the apparatus 200 is in an operation mode, such as a photographing mode or a video mode, the front-facing camera and/or the rear-facing camera may receive external multimedia data. Each of the front-facing camera and the rear-facing camera may be a fixed optical lens system or have a focal length and an optical zoom capacity.

The audio component 210 is configured to output and/or input audio signals. For example, the audio component 210 includes a microphone (MIC) configured to receive external audio signals when the apparatus 200 is in the operation mode, for example, a calling mode, a recording mode, and a speech recognition mode. The received audio signals may be further stored in the memory 204 or sent by means of the Communication component 216. In some examples, the audio component 210 further includes a loudspeaker for outputting audio signals.

The I/O interface 212 provides an interface between the Processing component 202 and peripheral interface modules, such as keyboards, click wheels, and buttons. These buttons may include, but are not limited to, home buttons, volume buttons, start buttons, and lock buttons.

The sensor component 214 may include one or more sensors configured to provide status assessment for various aspects of the apparatus 200. For example, the Sensor component 214 may detect an on/off status of the apparatus 200, and relative positioning of the assemblies. For example, the assemblies are the display and the keypad of the apparatus 200. The sensor component 214 may also detect a change in position of the apparatus 200 or one assembly of the apparatus 200, presence or not of contact between a user and the apparatus 200, an orientation or an acceleration/deceleration of the apparatus 200, and a change in temperature of the apparatus 200. The sensor component 214 may include a proximity sensor configured to detect the presence of objects nearby without any physical contact. The sensor component 214 may further include light sensors, such as complementary metal-oxide-semiconductor transistor (CMOS) or charge coupled device (CCD) image sensors for imaging applications. In some examples, the sensor component 214 may further include an acceleration sensor, a gyroscope sensor, a magnetic sensor, a pressure sensor, or a temperature sensor.

The communication component 216 is configured to facilitate wired or wireless communication between the apparatus 200 and other devices. The apparatus 200 may access a wireless network based on a communication standard, for example, WiFi, 2G, or 3G, or their combination. In an example, the communication component 216 receives a broadcast signal or broadcast related information from an external broadcast management system via a broadcast channel. In an example, the communication component 216 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, etc.

In an example, the apparatus 200 may be implemented by one or more application specific integrated circuits (ASIC), a digital signal processor (DSP), a digital signal processing device (DSPD), a programmable logic device (PLD), a field programmable gate array (FPGA), a controller, a microcontroller, a microprocessor, or other electronic elements for executing the method described above.

An example further provides a non-transitory computer-readable storage medium, including an instruction, for example, a memory 204 including an instruction, where the instruction described above may be executed by the processor 220 of the apparatus 200 so as to execute the method described above. For example, the non-transitory computer-readable storage medium may be a read-only memory (ROM), a random access memory (RAM), a compact disc read-only memory (CD-ROM), a magnetic tape, a floppy disk, an optical data storage device, etc.

Figure 7:
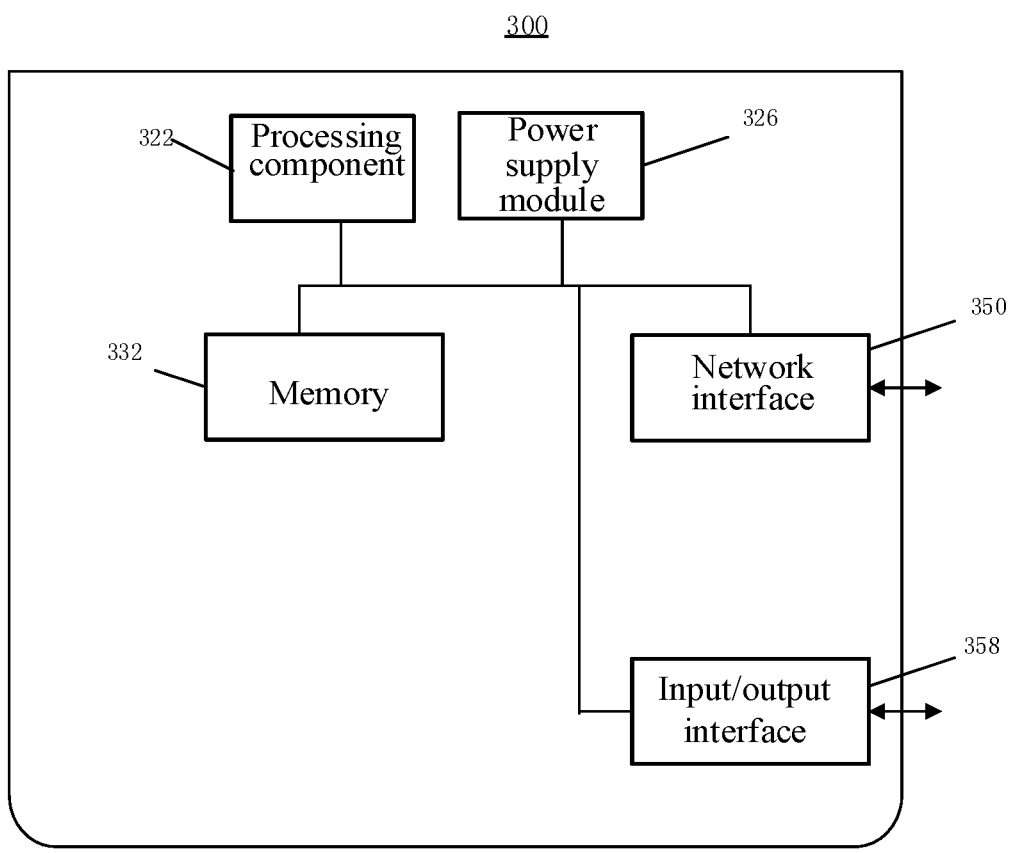
FIG. 7 is a block diagram of another apparatus for reporting a channel quality indication (CQI) shown according to an example.

FIG. 7 is block diagram of an apparatus 300 for resource configuration shown according to an example. For example, the apparatus 300 may be provided as a server. With reference to FIG. 7, the apparatus 300 includes a processing component 322 and further includes one or more processors and a memory resource represented by a memory 332 for storing instructions, such as applications executed by the processing component 322. The applications stored in the memory 332 may include one or more modules that each correspond to a set of instructions. In addition, the processing component 322 is configured to execute the instructions, so as to execute a network device involved in the method described above.

The apparatus 300 may further include a power supply module 326 configured to execute power supply management of the apparatus 300, a wired or wireless network interface 350 configured to connect the apparatus 300 to a network, and an input/output (I/O) interface 358. The apparatus 300 may operate an operation system stored in the memory 332, such as Windows Server™, Mac OS X™, Unix™, Linux™, FreeBSD™, etc.

It may be further understood that in the disclosure, "a plurality" refers to two or more, and other analogous quantifiers, "and/or" is used to describe an associated relation between associated objects, and means three relations, for example, A and/or B may mean A alone, A and B together, and B alone. The character "/" generally indicates that the associated objects are in an "or" relation. Singular forms "a," "an," and "the" are also intended to include plural forms, unless clearly indicated otherwise in the context.

It may be further understood that the terms "first," "second," etc., are used to describe various information, but these information should not be limited by these terms. These terms are merely used to distinguish the same type of information from each other, and do not denote a particular order or degree of importance. Indeed, the expressions "first," "second," etc., may be used interchangeably. For example, first information may also be referred to as second information, and similarly, second information may also be referred to as first information, without departing from the scope of the disclosure.

It may be further understood that in examples of the disclosure, while operations are described in the accompanying drawings in a particular order, it should not be understood as requiring that these operations be executed in the particular order shown or in the serial order, or that all operations shown be executed, so as to achieve desirable results. In certain circumstances, multitasking and parallel processing may be advantageous.

Other examples of the disclosure will readily occur to those skilled in the art upon consideration of the description and practice of the disclosure. The disclosure is intended to cover any variations, uses, or adaptations of the disclosure, and these variations, uses, or adaptations follow general principles of the disclosure and include common general knowledge or customary technical means in the technical field not disclosed in the disclosure. The description and examples are considered as illustrative only, and a true scope and spirit of the disclosure are indicated by the following claims.

It is to be understood that the disclosure is not limited to the precise structure that has been described above and shown in the accompanying drawings, and that various modifications and changes can be made without departing from its scope. The scope of the disclosure is limited only by the appended claims.

In order to solve the problems in the related art, the disclosure provides a method and apparatus for reporting a channel quality indication (CQI), and a storage medium.

According to a first aspect of examples of the disclosure, a method for reporting a channel quality indication (CQI) is provided. The method is applied to a first type of terminal and includes:
determining a CQI parameter set corresponding to the first type of terminal; and reporting the CQI according to the CQI parameter set.

In an example, the CQI parameter set is a third CQI parameter set, the third CQI parameter set corresponds to at least one of the following two cases:
a lowest spectral efficiency corresponding to the third CQI parameter set being less than a first threshold; and
a highest spectral efficiency corresponding to the third CQI parameter set being less than a second threshold.

In an example, the first threshold is determined based on a lowest spectral efficiency within a first CQI parameter set; and the first CQI parameter set is a CQI parameter set corresponding to a second type of terminal satisfying a requirement of a first block error rate (BLER).

In an example, the third CQI parameter set has the same number of indexes of the CQI as a first CQI parameter set, and at least one spectral efficiency in the third CQI parameter set is less than the first threshold.

In an example, the CQI parameter set is a second CQI parameter set, the second CQI parameter set being a CQI parameter set corresponding to a second type of terminal satisfying a requirement of a second BLER.

In an example, reporting the CQI according to the CQI parameter set includes:
in response to determining that a spectral efficiency of the first type of terminal is less than a first threshold, reporting the CQI according to the second CQI parameter set;
or
in response to determining that the first type of terminal receives a first instruction message, reporting the CQI according to the second CQI parameter set, the first instruction message being configured to instruct the terminal to be configured with the second CQI parameter set.

In an example, reporting the CQI according to the CQI parameter set includes:
determining a first offset and a measured channel quality parameter; determining a revised channel quality parameter according to the measured channel quality parameter and the first offset; and determining and reporting the CQI according to the revised channel quality parameter and a first CQI parameter set.

In an example, the first offset is determined based on predefined information.

In an example, reporting the CQI according to the CQI parameter set includes:
determining measurement resources, the measurement resources including a plurality of repeated transmissions;

performing measurement and combination based on the measurement resources encompassing the plurality of repeated transmissions, and determining a channel quality parameter combined and measured; and
determining and reporting the CQI based on a first CQI parameter set and/or a second CQI parameter set, and the channel quality parameter combined and measured.

In an example, the number of the plurality of repeated transmissions is determined based on radio resource control (RRC) signaling;
or
based on the maximum transmission number of a downlink physical channel.

In an example, the requirement of the first BLER is that a BLER of a data channel is less than a first percentage threshold when a modulation mode and a coding rate in the CQI parameter set are used;
or
the requirement of the first BLER is that a BLER of a data channel is equal to a first percentage threshold when a modulation mode and a coding rate in the CQI parameter set are used.

In an example, the requirement of the second BLER is that a BLER of a data channel is less than a second percentage threshold when a modulation mode and a coding rate in the CQI parameter set are used;
or
the requirement of the second BLER is that a BLER of a data channel is equal to a second percentage threshold when a modulation mode and a coding rate in the CQI parameter set are used.

In an example, the first type of terminal has a less channel quality parameter than the second type of terminal.

According to a second aspect of examples of the disclosure, provided is an apparatus for reporting a channel quality indication (CQI). The apparatus is applied to a first type of terminal and includes:
a determining module configured to determine a CQI parameter set corresponding to the first type of terminal; and a reporting module configured to report the CQI according to the CQI parameter set.

In an example, the CQI parameter set is a third CQI parameter set, the third CQI parameter set corresponds to at least one of the following two cases:
a lowest spectral efficiency corresponding to the third CQI parameter set being less than a first threshold; and
a highest spectral efficiency corresponding to the third CQI parameter set being less than a second threshold.

In an example, the first threshold is determined based on a lowest spectral efficiency within a first CQI parameter set; and the first CQI parameter set is a CQI parameter set corresponding to a second type of terminal satisfying a requirement of a first block error rate (BLER).

In an example, the third CQI parameter set has the same number of indexes of the CQI as a first CQI parameter set, and at least one spectral efficiency in the third CQI parameter set is less than the first threshold.

In an example, the CQI parameter set is a second CQI parameter set, the second CQI parameter set being a CQI parameter set corresponding to a second type of terminal satisfying a requirement of a second BLER.

In an example, the reporting module is configured to:
in response to determining that a spectral efficiency of the first type of terminal is less than a first threshold, report the CQI according to the second CQI parameter set;
or in response to determining that the first type of terminal receives a first instruction message, report the CQI according to the second CQI parameter set, the first instruction message being configured to instruct the terminal to be configured with the second CQI parameter set.

In an example, the reporting module is configured to:
determine a first offset and a measured channel quality parameter;
determine a revised channel quality parameter according to the measured channel quality parameter and the first offset; and
determine and report the CQI according to the revised channel quality parameter and a first CQI parameter set.

In an example, the first offset is determined based on predefined information.

In an example, the reporting the CQI according to the CQI parameter set includes:
determining measurement resources, the measurement resources including a plurality of repeated transmissions;
performing measurement and combination based on the measurement resources encompassing the plurality of repeated transmissions, and determining a channel quality parameter combined and measured; and
determining and reporting the CQI based on a first CQI parameter set and/or a second CQI parameter set, and the channel quality parameter combined and measured.

In an example, the number of the plurality of repeated transmissions is determined based on radio resource control (RRC) signaling;
or
based on the maximum transmission number of a downlink physical channel.

In an example, the requirement of the first BLER is that a BLER of a data channel is less than a first percentage threshold when a modulation mode and a coding rate in the CQI parameter set are used;
or
the requirement of the first BLER is that a BLER of a data channel is equal to a first percentage threshold when a modulation mode and a coding rate in the CQI parameter set are used.

In an example, the requirement of the second BLER is that a BLER of a data channel is less than a second percentage threshold when a modulation mode and a coding rate in the CQI parameter set are used;
or
the requirement of the second BLER is that a BLER of a data channel is equal to a second percentage threshold when a modulation mode and a coding rate in the CQI parameter set are used.

In an example, the first type of terminal has a less channel quality parameter than the second type of terminal.

According to a third aspect of examples of the disclosure, provided is an apparatus for reporting a channel quality indication (CQI). The apparatus includes:
a processor; and a memory configured to store an instruction executable by the processor; where the processor is configured to execute the method for reporting a CQI in the first aspect or in any one of the examples in the first aspect.

According to a fourth aspect of examples of the disclosure, provided is a non-transitory computer-readable storage medium, where an instruction in a storage medium causes a mobile terminal to execute the method for reporting a CQI in the first aspect or any one of the examples in the first aspect when executed by a processor of the mobile terminal.

The technical solutions according to the examples of the disclosure may have the beneficial effects as follows: by employing the CQI parameter set corresponding to reduced capability user equipment and configured to report the CQI, a network device may determine accurate channel state information of the terminal according to an index of the reported CQI, so as to employ a corresponding compensation strategy for compensation.

It is to be understood that the above general description and the following detailed description are merely illustrative and explanatory, and are not intended to limit the disclosure.

What is claimed is:

1. A method for reporting a channel quality indication (CQI), performed by a first type of terminal and comprising:
determining a CQI parameter set corresponding to the first type of terminal; and
reporting the CQI according to the CQI parameter set;
wherein reporting the COQI according to the COI parameter set comprises:
determining a first offset and a measured channel quality parameter;
determining a revised channel quality parameter according to the measured channel quality parameter and the first offset; and
determining and reporting the COI according to the revised channel quality parameter and a first COI parameter set; wherein the first COI parameter set is a COI parameter set corresponding to a second type of terminal satisfying a requirement of a first block error rate (BLER).

2. The method for reporting a CQI according to claim 1, wherein the CQI parameter set is a third CQI parameter set, the third CQI parameter set corresponding to at least one of the following:
a lowest spectral efficiency corresponding to the third CQI parameter set being less than a first threshold, or
a highest spectral efficiency corresponding to the third CQI parameter set being less than a second threshold.

3. The method for reporting a CQI according to claim 2, wherein the first threshold is determined based on a lowest spectral efficiency within the first CQI parameter set.

4. The method for reporting a CQI according to claim 3, wherein the requirement of the first BLER is that a BLER of a data channel is less than a first percentage threshold when a modulation mode and a coding rate in the CQI parameter set are used.

5. The method for reporting a CQI according to claim 3, wherein the requirement of the first BLER is that a BLER of a data channel is equal to a first percentage threshold when a modulation mode and a coding rate in the CQI parameter set are used.

6. The method for reporting a CQI according to claim 2, wherein the third CQI parameter set has a same number of indexes of the CQI as the first CQI parameter set, and at least one spectral efficiency in the third CQI parameter set is less than the first threshold.

7. The method for reporting a CQI according to claim 1, wherein the CQI parameter set is a second CQI parameter set, the second CQI parameter set being a CQI parameter set corresponding to a second type of terminal satisfying a requirement of a second BLER.

8. The method for reporting a CQI according to claim 7, wherein reporting the CQI according to the CQI parameter set comprises:

in response to determining that a spectral efficiency of the first type of terminal is less than a first threshold, reporting the CQI according to the second CQI parameter set.

9. The method for reporting a CQI according to claim 7, wherein the requirement of the second BLER is that a BLER of a data channel is less than a second percentage threshold when a modulation mode and a coding rate in the CQI parameter set are used.

10. The method for reporting a CQI according to claim 7, wherein reporting the CQI according to the CQI parameter set comprises:
in response to determining that the first type of terminal receives a first instruction message, reporting the CQI according to the second CQI parameter set, the first instruction message being configured to instruct a terminal to be configured with the second CQI parameter set.

11. The method for reporting a CQI according to claim 7, wherein the requirement of the second BLER is that a BLER of a data channel is equal to a second percentage threshold when a modulation mode and a coding rate in the CQI parameter set are used.

12. The method for reporting a CQI according to claim 1, wherein the first offset is determined based on predefined information.

13. The method for reporting a CQI according to claim 1, wherein reporting the CQI according to the CQI parameter set comprises:
determining measurement resources, the measurement resources comprising a plurality of repeated transmissions;
performing measurement and combination based on the measurement resources encompassing the plurality of repeated transmissions, and determining a channel quality parameter combined and measured; and
determining and reporting the CQI based on at least one of the first CQI parameter set or a second CQI parameter set, and based on the channel quality parameter combined and measured.

14. The method for reporting a CQI according to claim 13, wherein a number of the plurality of repeated transmissions is determined based on radio resource control (RRC) signaling.

15. The method for reporting a CQI according to claim 13, wherein a number of the plurality of repeated transmissions is determined based on a maximum transmission number of a downlink physical channel.

16. The method for reporting a CQI according to claim 1, wherein the first type of terminal has a less channel quality parameter than a second type of terminal.

17. An apparatus for reporting a channel quality indication (CQI), comprising:
one or more processors; and
a memory configured to store an instruction executable by the one or more processors; wherein
the one or more processors are collectively configured to:
determine a CQI parameter set corresponding to a first type of terminal; and
report the CQI according to the CQI parameter set;
wherein the one or more processors are further collectively configured to:
determine a first offset and a measured channel quality parameter;
determine a revised channel quality parameter according to the measured channel quality parameter and the first offset; and
determine and report the COI according to the revised channel quality parameter and a first COI parameter set; wherein the first COI parameter set is a COI parameter set corresponding to a second type of terminal satisfying a requirement of a first block error rate (BLER).

18. The apparatus for reporting a CQI according to claim 17, wherein the CQI parameter set is a third CQI parameter set, the third CQI parameter set corresponding to at least one of the following:
a lowest spectral efficiency corresponding to the third CQI parameter set being less than a first threshold, or
a highest spectral efficiency corresponding to the third CQI parameter set being less than a second threshold.

19. A non-transitory computer-readable storage medium, wherein an instruction in the storage medium, when executed by one or more processors of a mobile terminal, causes the mobile terminal to execute a method for determining;
determine a channel quality indication (CQI) parameter set corresponding to a first type of terminal; and
report the CQI according to the CQI parameter set;
wherein the instruction in the storage medium, when executed by the one or more processors of the mobile terminal, causes the mobile terminal to:
determine a first offset and a measured channel quality parameter;
determine a revised channel quality parameter according to the measured channel quality parameter and the first offset; and
determine and report the COI according to the revised channel quality parameter and a first COI parameter set; wherein the first COQI parameter set is a COI parameter set corresponding to a second type of terminal satisfying a requirement of a first block error rate (BLER).

* * * * *